(12) United States Patent
Nagayoshi et al.

(10) Patent No.: US 7,911,558 B2
(45) Date of Patent: Mar. 22, 2011

(54) IMAGE DISPLAY APPARATUS AND BACKLIGHT UNIT TO BE USED THEREIN

(75) Inventors: Mayumi Nagayoshi, Chofu (JP); Satoshi Ouchi, Kamakura (JP); Seiji Murata, Yokohama (JP); Yasutaka Tsuru, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 12/127,025

(22) Filed: May 27, 2008

(65) Prior Publication Data

US 2008/0297692 A1 Dec. 4, 2008

(30) Foreign Application Priority Data

Jun. 1, 2007 (JP) ................. 2007-146641

(51) Int. Cl.
*G02F 1/1333* (2006.01)
*G02F 1/1335* (2006.01)
(52) U.S. Cl. .................................. 349/64; 349/58
(58) Field of Classification Search ............ 349/58, 349/61, 64, 65, 149–152
See application file for complete search history.

(56) References Cited

U.S. PATENT DOCUMENTS

| 2002/0097353 | A1* | 7/2002 | Lee | 349/58 |
| 2004/0252254 | A1* | 12/2004 | Koo et al. | 349/58 |
| 2005/0243260 | A1* | 11/2005 | Kim | 349/149 |
| 2006/0044780 | A1 | 3/2006 | Kim | |
| 2009/0122216 | A1* | 5/2009 | Kogure et al. | 349/58 |

FOREIGN PATENT DOCUMENTS

| CN | 1664673 | 9/2005 |
| EP | 1 790 905 A1 | 5/2007 |
| JP | 2004-127643 | 4/2004 |
| JP | 2004-220980 | 8/2004 |
| JP | 2004-325671 | 11/2004 |
| JP | 2006-66360 | 3/2006 |
| JP | 2006-195276 | 7/2006 |

* cited by examiner

*Primary Examiner* — David Nelms
*Assistant Examiner* — David Y Chung
(74) *Attorney, Agent, or Firm* — Antonelli, Terry, Stout & Kraus, LLP.

(57) ABSTRACT

An image display apparatus includes a backlight unit including a plurality of light sources arranged in a flat, a reflecting portion for reflecting light from the light sources, a diffuser for diffusing the light from the light sources and the light reflected from the reflecting portion, and a chassis for maintaining or supporting the light sources, the reflecting portion and the diffuser; and a liquid crystal display unit which receives the light diffused by the diffuser of the backlight unit. Concave portions are formed in the chassis at positions corresponding to electrodes of the plurality of light sources, positions corresponding to light-emitting portions of the light sources are arranged in a flat, and a circuit for driving the liquid crystal display unit is provided on a rear surface of a planar portion of the chassis. Accordingly, it is possible to realize a thin lightweight backlight with high luminance and high luminance uniformity.

10 Claims, 5 Drawing Sheets

IMAGE DISPLAY APPARATUS AND BACKLIGHT UNIT TO BE USED THEREIN

INCORPORATION BY REFERENCE

The present application claims priority from Japanese application JP2007-146641 filed on Jun. 1, 2007, the content of which is hereby incorporated by reference into this application.

FIELD OF THE INVENTION

The present invention relates to an image display apparatus using a liquid crystal display element, and more particularly, to an improved backlight unit for irradiating light to a liquid crystal display element.

DESCRIPTION OF RELATED ART

Recently, as a backlight unit of a liquid crystal display apparatus, a direct light type backlight unit capable of realizing a large size and high luminance has been increased. However, since the luminance is high directly above light sources and is low between the light sources, non-uniformity of luminance occurs.

In order to solve such a problem, for example, in JP-A-2006-195276, there is disclosed a technology that a prism array having a sawtoothed cross-section is provided as diffusion means for diffusing light from a light source. In JP-A-2004-127643, diffusion means having a high haze value of 95% or more is used as diffusion means for diffusing light from a light source.

If the thickness (depth) of an image display apparatus (a liquid crystal panel including a liquid crystal display element) is decreased, an optical distance between a backlight and the liquid crystal display element is decreased and the non-uniformity of luminance becomes larger. Accordingly, in order to thin the image display apparatus, it is preferable that the light irradiated from the light source to the liquid crystal display element becomes more uniform.

However, in order to realize uniformity of the light irradiated to the liquid crystal display element, if a prism pattern is formed in the diffusion means as JP-A-2006-195276, cost is increased and a diffusion degree is increased by the diffusion means. Thus, the efficiency from the light source may deteriorate and thus the luminance of an image may deteriorate. Even in the case where the diffusion means having a high haze value is used as JP-A-2004-127643, the efficiency from the light source deteriorates.

BRIEF SUMMARY OF THE INVENTION

The present invention is to solve the conventional problems and it is an object of the present invention to provide a technology of reducing non-uniformity of luminance and of obtaining high efficiency even when an image display apparatus is thinned.

In order to accomplish the object, according to an aspect of the present invention, there is provided an image display apparatus comprising: a backlight unit including a plurality of light sources arranged in a flat, a reflecting portion for reflecting light from the light sources, a diffuser for diffusing the light from the light sources and the light reflected from the reflecting portion, and a chassis for maintaining or supporting the light sources, the reflecting portion and the diffuser; and a liquid crystal display unit which receives the light diffused by the diffuser of the backlight unit, wherein the chassis has concave portions formed at positions corresponding to electrodes of the plurality of light sources and planar portions formed at positions corresponding to light-emitting units of the light sources, and a circuit for driving the liquid crystal display unit is provided on a rear surface of the planar portion of the chassis.

The chassis may be formed of metal or conductive material. The concave portions of the chassis may be provided at the positions corresponding to the light sources in a direction perpendicular to a display surface of the image display apparatus.

According to the present invention, it is possible to realize high efficiency while reducing non-uniformity of luminance in an image display apparatus.

Other objects, features and advantages of the invention will become apparent from the following description of the embodiments of the invention taken in conjunction with the accompanying drawings.

BRIEF DESCRIPTION OF SEVERAL VIEWS OF DRAWING

DETAILED DESCRIPTION OF THE INVENTION

Hereinafter, an embodiment according to the present invention will be described with reference to the accompanying drawings.

Figure 1:
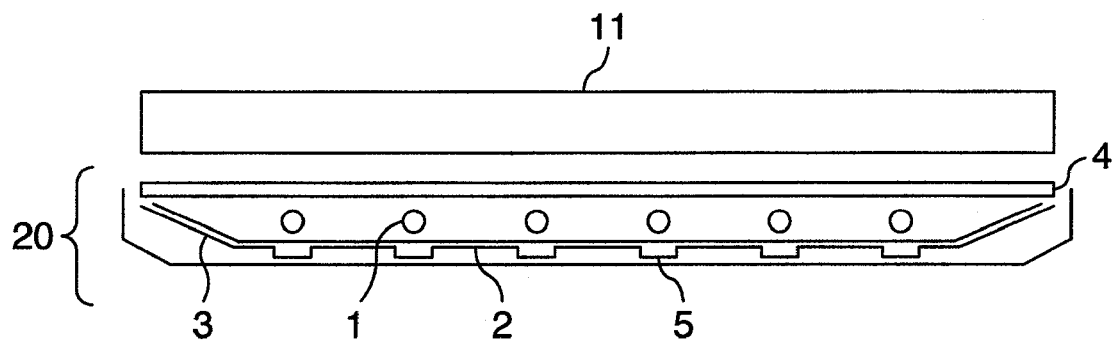
FIG. 1 is a cross-sectional view showing an embodiment of an image display apparatus according to the present invention.

FIG. 1 is a cross-sectional view showing an image display apparatus according to an embodiment of the present invention. This cross-sectional view is a vertical cross-sectional view of the image display apparatus when viewed from the side thereof. Accordingly, light sources 1 extend in a horizontal direction (a right-left direction in the drawing) of an image area of the image display apparatus. The image display apparatus comprises a liquid crystal display element 11 and a backlight unit 20 for irradiating light to the liquid crystal display element 11. The backlight unit 20 includes a plurality of light sources 1 arranged in a flat, a reflecting portion 3 for reflecting the light from the light sources, a diffuser 4 for diffusing the light from the light sources 1 and the light reflected from the reflecting portion 3, and a chassis 2 for maintaining or supporting the light sources 1, the reflecting portion 3 and the diffuser 4.

The light sources used in the backlight unit need to be driven by a high voltage and a high frequency at the time of start-up. Since the conventional backlight unit has a sufficient distance from the chassis to the light sources, the light sources uniformly emit the light with high efficiency regardless of floating capacitance between the chassis and the light sources. However, if the distance from the chassis to the light sources is decreased by thinning the backlight unit, leak current occurs with respect to the floating capacitance between the chassis and the light sources. If the leak current occurs, the light sources do not uniformly emit the light. Thus, it is necessary to suppress the leak current such that the light sources uniformly emit the light.

Accordingly, in the present embodiment, as shown in FIG. 1, slits or depressions 5 (hereinafter, referred to as "concave portions") are provided on the surface of the chassis 2 of the backlight unit 20 below the light sources at positions in the chassis 2 corresponding to the light sources 1 in a direction perpendicular to a display surface of the image display apparatus (in a vertical direction of FIG. 1). With this configuration, it is possible to suppress the leak current and realize high efficiency of the light sources. It is preferable that the concave portions 5 of the chassis 2 are provided by the number equal to or more than the number of light sources 1. However, in consideration of the strength, the number of concave portions 5 may be less than the number of light sources 1. By providing the concave portions 5 of the chassis and adjusting the size thereof, the light sources can be provided to be close to the chassis while emitting the light with high efficiency. As a result, since an optical diffusion distance from the light sources to the diffuser can be made long, uniformity of luminance can be obtained even when the backlight unit thins.

Figure 7:
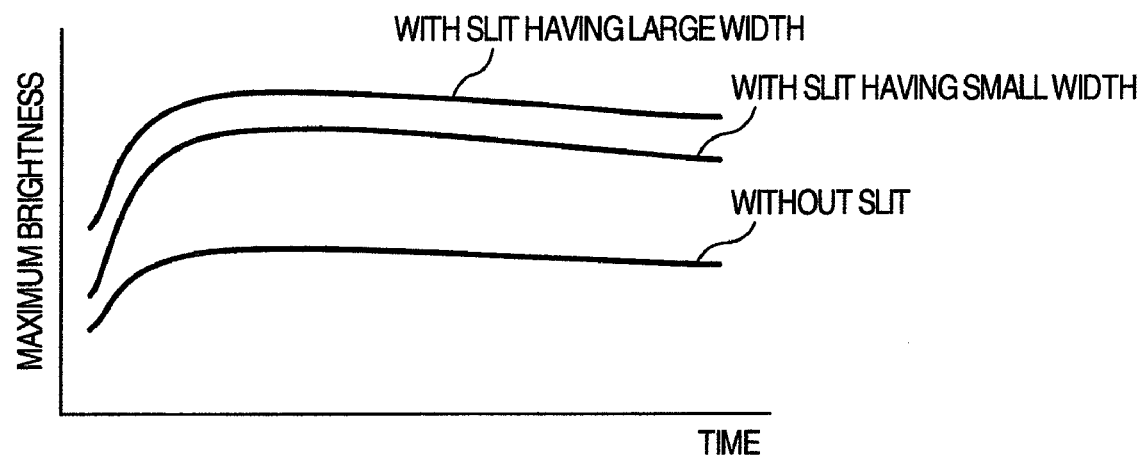
FIG. 7 is a view showing the effect of the present example.

FIG. 7 shows an experimental result of a variation with the lapse of time of maximum luminance, in the case that the concave portions 5 are not formed in the chassis 2 of the backlight unit 20 and in the case that the concave portions are formed. When the concave portions 5 are not formed, the maximum luminance is lowest and, when the concave portions 5 each having a large width are formed, the maximum luminance is highest. Accordingly, it can be seen that it is possible to suppress the leak current and realize the high efficiency of the light sources, by forming the concave portions 5 in the chassis 2.

Figure 8:
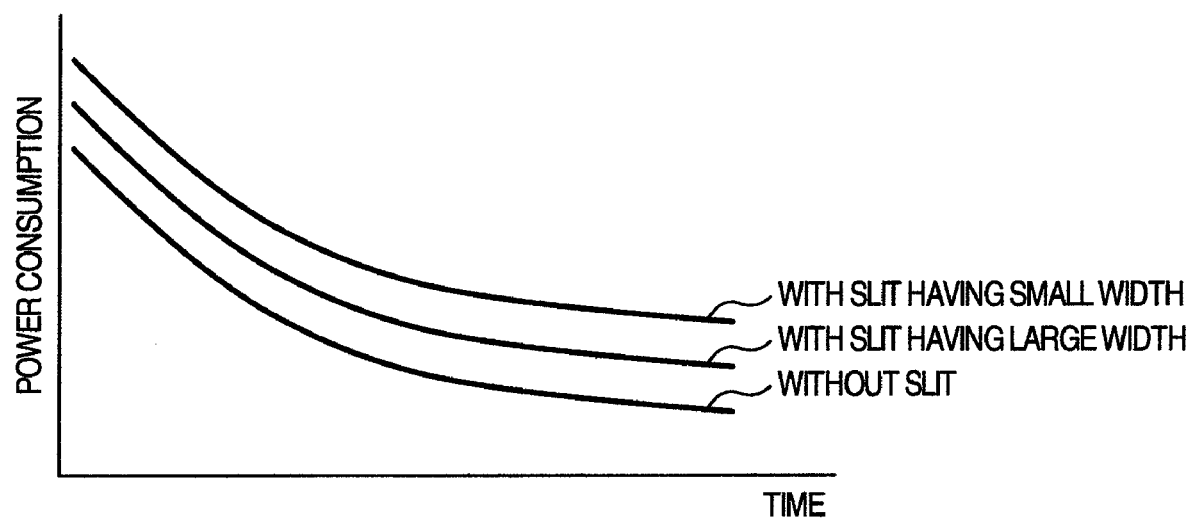
FIG. 8 is a view showing the effect of the present example.

FIG. 8 shows an experimental result of a variation with the lapse of time of power consumption, in the case that the concave portions 5 are not formed in the chassis 2 of the backlight unit 20 and in the case that the concave portions are formed. It can be seen that, when the concave portions 5 are not formed, the power consumption is lowest and, when the slits or depressions each having a small width are formed, the power consumption is highest.

Figure 10:
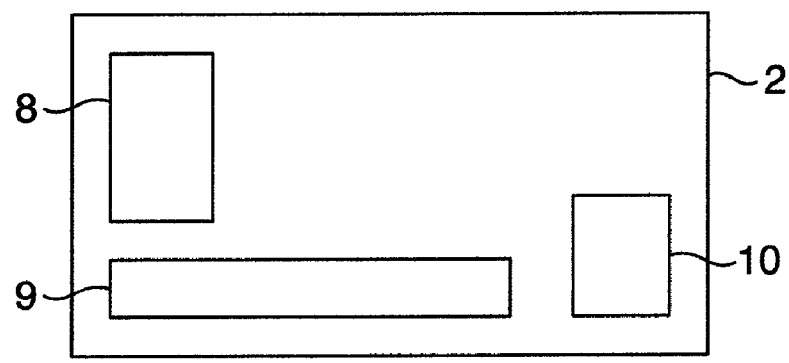
FIG. 10 is a view showing an example of an image display apparatus according to the present invention.

FIG. 10 is a view showing an example of an image display apparatus including the backlight unit according to the present embodiment when the image display apparatus is viewed from the rear surface thereof. The image display apparatus includes a power supply source 8 for supplying power to the backlight unit, the liquid crystal display element or the like, a signal processor 9 for performing predetermined signal processing, such as adjustment of contrast and conversion of a frame rate, with respect to an image signal supplied to the liquid crystal display element, and a structure 10 such as a speaker.

Next, embodiments of the present invention will be described with reference to FIGS. 2 to 9.

Embodiment 1

Figure 2:
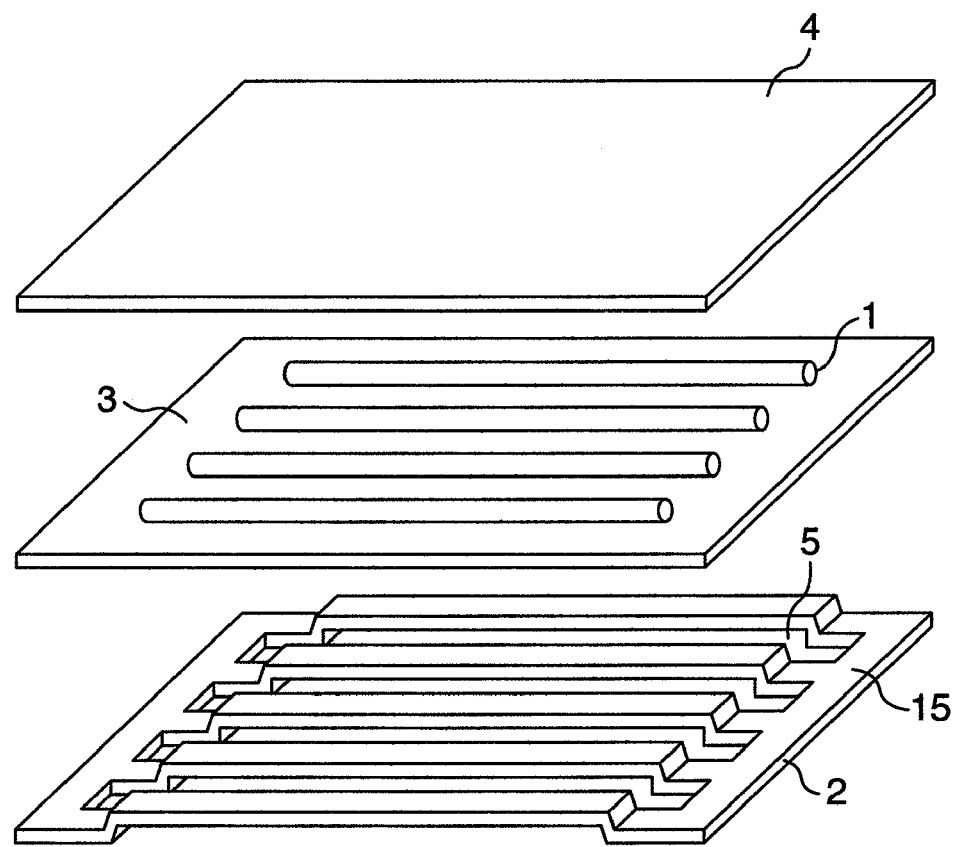
FIG. 2 is a view showing a backlight unit according to a first embodiment of the present invention.
Figure 3:
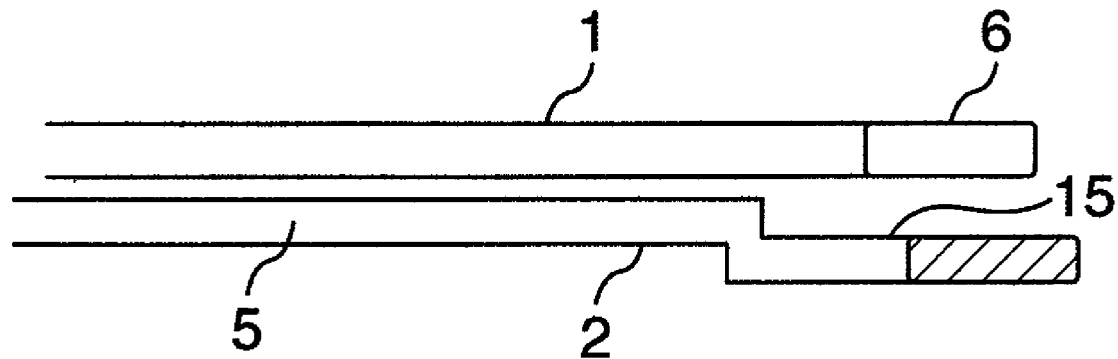
FIG. 3 is a view showing the backlight unit according to the first embodiment of the present invention.

FIGS. 2 and 3 are views showing a backlight unit according to a first embodiment of the present invention. The plurality of concave portions 5 are formed at positions corresponding to the arrangement positions of the light sources 1 such that a predetermined distance between the chassis 2 and the light sources 1 is maintained. In the present embodiment, as shown in FIG. 3, the concave portions 5 are provided in the chassis 2 in the vicinities of electrodes 6 of the light sources 1. In addition, in the present embodiment, a stepped portion 15 is formed in the chassis 2 such that a gap between the chassis 2 and the electrodes of the light sources 1 is larger than a gap between the chassis 2 and central portions (light-emitting portions) of the light sources 1. In the both ends of the backlight unit 20, portions excluding the concave portions 5 are connected to each other.

FIG. 3 is a partial enlarged view of the cross section of FIG. 2. In order to prevent the leak current, it is necessary to maintain the predetermined distance between the chassis 2 and portions near the electrodes 6 of the light sources 1. Accordingly, in the present embodiment, the concave portions 5 (slits in this embodiment) of the chassis 2 are provided at the positions corresponding to the arrangement positions of the light sources 1. Accordingly, the concave portions 5 of the present embodiment is formed to be a horizontally long shape so as to extend parallel with the longitudinal direction of the light sources 1. In addition, in the present embodiment, the stepped portion 15 mentioned above is formed such that the electrodes 6 of the light sources 1 are spaced apart from the chassis 2. By the slits 5 and the stepped portion 15, the distance between the chassis 2 and the light sources 1 can be increased and the floating capacitance between the chassis 2 and the electrodes 6 can be reduced, thereby suppressing the leak current. Here, the chassis 2 is formed of metal such as aluminum and can be formed with low cost.

Embodiment 2

Figure 4:
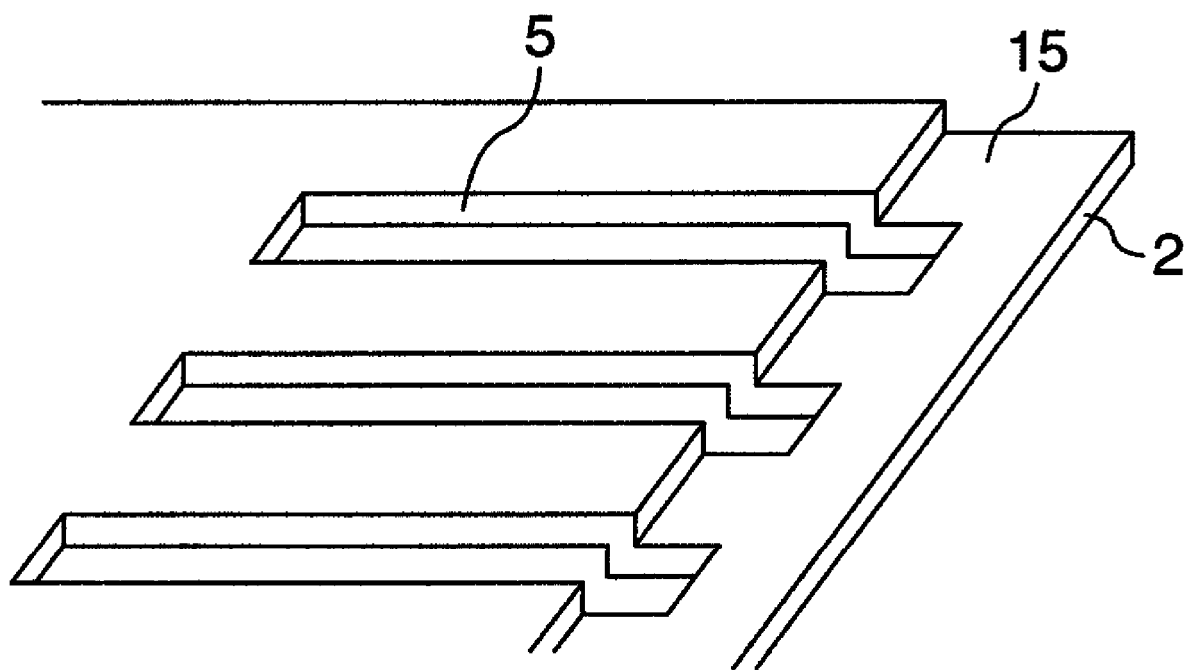
FIG. 4 is a view showing a backlight unit according to a second embodiment of the present invention.

FIG. 4 is a view showing a backlight unit according to a second embodiment of the present invention and, more particularly, is an enlarged view showing main portions of one side. The plurality of concave portions 5 are formed in a front surface of the chassis 2 at positions corresponding to the light sources 1 and may not be provided so as to correspond to the overall shapes of the light sources 1. That is, in the present embodiment, the concave portions 5 may be provided only at the positions corresponding to the portions near the electrodes 6 of the light sources 1. In addition, in this embodiment, the same stepped portion 15 as the first embodiment is formed in the chassis 2 at the positions facing the electrodes 6 of the light sources 1 and the gap between the chassis 2 and the electrodes of the light sources 1 is larger than the gap between the chassis 2 and the central portions of the light sources 1. In this case, since irregularities or openings such as the concave portions 5 are not formed in a rear surface of the chassis 2, the power supply source 8, the signal processor 9, the structure 10 and so on can be attached to the rear surface of the chassis 2. This constitution can prevent deterioration of the strength of the chassis due to the concave portions 5 formed in the chassis 2.

Embodiment 3

Figure 5:
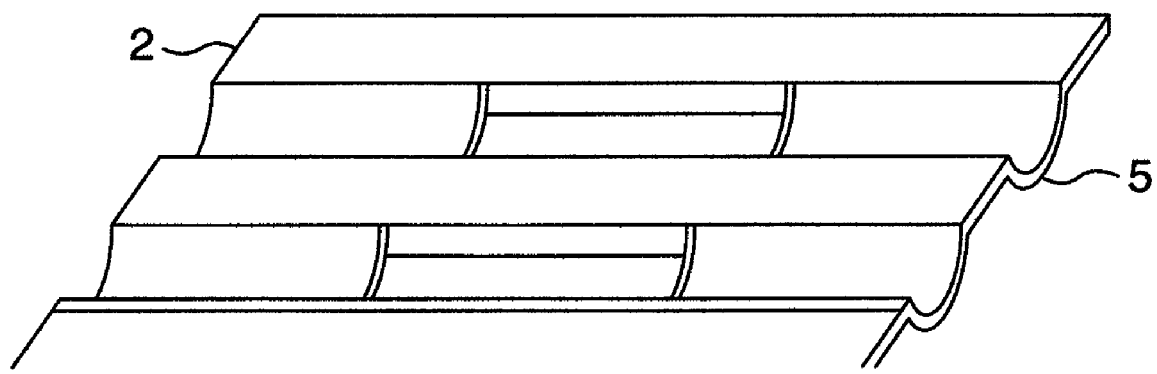
FIG. 5 is a view showing a backlight unit according to a third embodiment of the present invention.

FIG. 5 is a view showing a backlight unit according to a third embodiment of the present invention and, more particularly, is an enlarged view showing main portions. As shown in FIG. 5, the plurality of concave portions 5 each having a U-shaped cross section are formed in the chassis 2. The concave portions may be formed by drawing or half piercing. Holes may be provided in portions of the concave portions 5.

Figure 6:
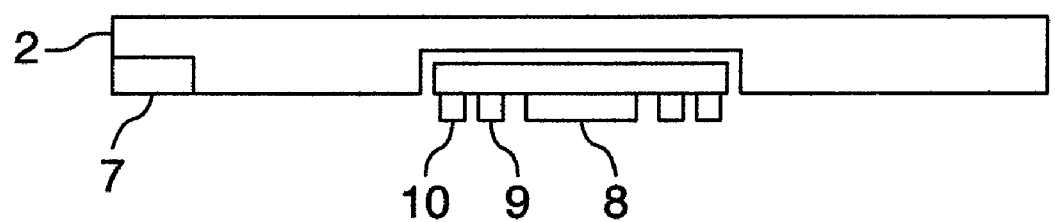
FIG. 6 is a view showing the backlight unit according to the third embodiment of the present invention.

FIG. 6 is a cross-sectional view of FIG. 5. If the plurality of concave portions 5 each having the U-shaped cross section are provided in the chassis 2 only at the positions corresponding to the portions near the electrodes 6 of the light sources 1 like Embodiment 2, as shown in FIG. 6, the power supply source 8, the signal processor 9, the structure 10, and a substrate such as an inverter 7 for driving the light source 1 can be attached to the rear surface of the chassis 2. Accordingly, it is possible to provide a thin backlight unit.

FIG. 7 shows an experimental result of a variation with the lapse of time of maximum luminance, in the case that the concave portions 5 are not formed in the chassis 2 of the backlight unit 20 and in the case that the concave portions are formed. When the concave portions 5 are not formed, the maximum luminance is lowest and, when the concave portions 5 each having a large width are formed, the maximum luminance is highest. Accordingly, it can be seen that it is possible to suppress the leak current and realize the high efficiency of the light sources, by forming the concave portions 5 in the chassis 2.

Embodiment 4

Figure 9:
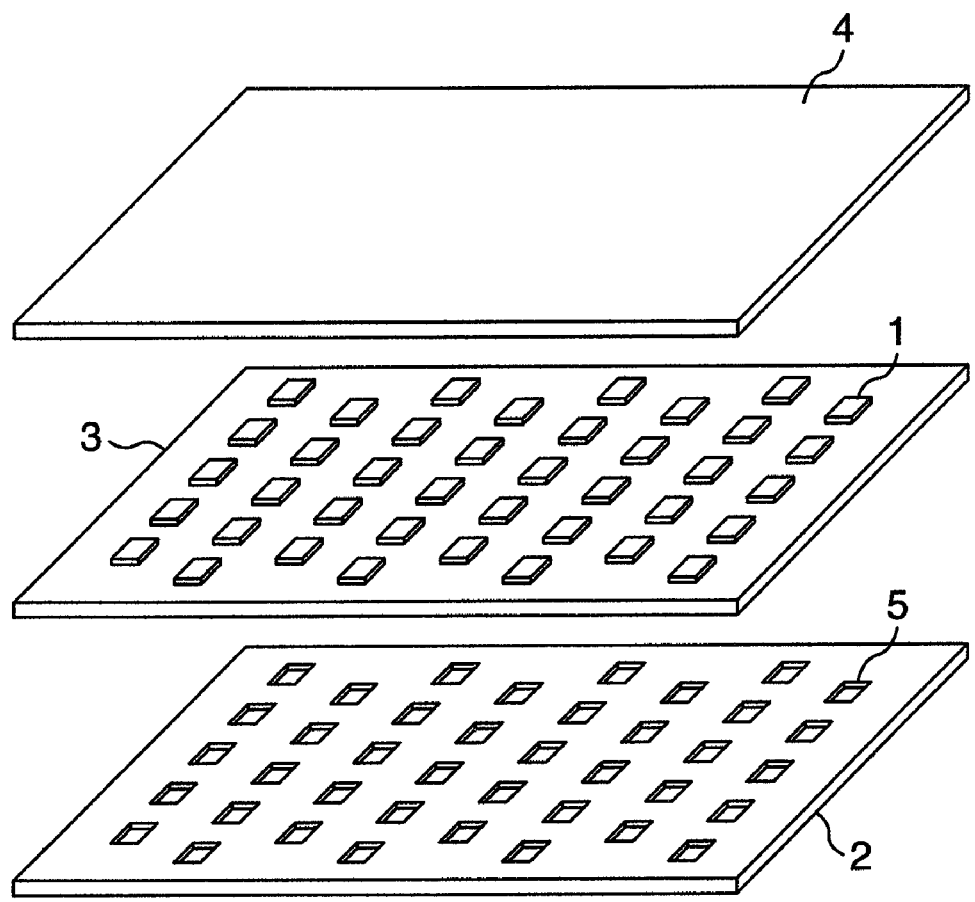
FIG. 9 is a view showing a backlight unit according to a fourth embodiment of the present invention.

FIG. 9 is a view showing a backlight unit according to a fourth embodiment of the present invention. In the present embodiment, the plurality of light sources 1 are, for example, formed of light-emitting diodes (LEDs). If the shape of the light sources 1 is circular, elliptical, square, rectangular, and polygonal, as shown in FIG. 9, the shape of the concave portions 5 corresponds to the shape of the light sources 1. In the example of FIG. 9, the shape of the light sources 1 is rectangular and the shape of the concave portions 5 is also rectangular corresponding to the light sources. Even in the present embodiment, similar to Embodiments 1 to 3, the light sources 1 and the concave portions 5 correspond to each other in the positions thereof.

Hereinafter, the effects of the embodiment according to the present invention will be described. The present embodiment includes the backlight unit including the plurality of light sources in a flat, the reflecting portion for reflecting the light from the light sources, the diffuser for diffusing the light from the light source and the light reflected from the reflecting portion, and the chassis for maintaining or supporting the light source, the reflecting portion and the diffuser and the liquid crystal display unit which receives the light diffused by the diffuser of the backlight unit. The chassis includes the plurality of slits or depressions and is spaced apart from the light sources by the predetermined distance. Accordingly, it is possible to prevent luminous efficiency of the light sources from deteriorating due to the leak current.

Since the slits or the depressions of the chassis are provided at the positions corresponding to the light sources in the direction perpendicular to the display surface of the image display apparatus, it is possible to prevent luminous efficiency of the light sources from deteriorating due to the leak current.

Since the plurality of slits or the depressions of the chassis are provided at only the positions corresponding to the vicinities of the electrodes of the light sources, the strength of the chassis is maintained and the light sources or a circuit can be attached to a portion having no slit.

Since the chassis is formed of metal or conductive material, the chassis can be readily formed with low cost and a start-up voltage at the time of light emission of the light sources can be decreased.

According to the present embodiment, for example, in the image display apparatus using the liquid crystal display element, it is possible to obtain an image with high luminance and high uniformity. Although the liquid crystal display element is used as a display element in the embodiment, the present invention is applicable to any passive type display element.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display apparatus comprising:
a backlight unit including a plurality of light sources arranged in a flat, a reflecting portion for reflecting light from said light sources, a diffuser for diffusing the light from said light sources and the light reflected from said reflecting portion, and a chassis for maintaining or supporting said light sources, said reflecting portion and said diffuser; and
a liquid crystal display unit which receives the light diffused by said diffuser of said backlight unit,
wherein concave portions are formed in said chassis at positions corresponding to electrodes of said plurality of light sources so that said concave portions enable a predetermined gap between said electrodes of said light sources and said chassis thereat, positions corresponding to light-emitting portions of said light sources are arranged in a flat, and a circuit for driving said liquid crystal display unit is provided on a rear surface of a planar portion of said chassis.

2. The image display apparatus according to claim 1, wherein said chassis is formed of metal or conductive material.

3. The image display apparatus according to claim 1, wherein said concave portions of said chassis are provided at the positions corresponding to said light sources in a direction perpendicular to a display surface of said image display apparatus.

4. A backlight unit used in an image display apparatus, said backlight unit comprising:
a plurality of light sources arranged in a flat;
a reflecting portion for reflecting light from said light sources;
a diffuser for diffusing the light from said light sources and the light reflected from said reflecting portion and irradiating the light to a liquid crystal display unit; and
a chassis for maintaining or supporting said light sources, said reflecting portion and said diffuser,
wherein concave portions are formed in said chassis at positions corresponding to electrodes of said plurality of light sources so that said concave portions enable a predetermined gap between said electrodes of said light sources and said chassis thereat, and positions corresponding to light-emitting portions of said light sources are arranged in a flat.

5. The image display apparatus according to claim 1, wherein a floating capacitance is generated between said chassis and said electrodes of said light sources, and said concave portions enable suppression of a leak current with respect to said floating capacitance between said chassis and said electrodes of said light sources.

6. The image display apparatus according to claim 1, wherein said concave portions enable improved luminance of the display apparatus.

7. The image display apparatus according to claim 1, wherein said concave portions enable the predetermined gap between said electrodes of said light sources and said chassis to be greater than a gap of at least central portions of said light sources between said electrodes thereof and corresponding portions of said chassis.

8. The image display apparatus according to claim 4, wherein a floating capacitance is generated between said chassis and said electrodes of said light sources, and said concave portions enable suppression of a leak current with respect to said floating capacitance between said chassis and said electrodes of said light sources.

9. The image display apparatus according to claim 4, wherein said concave portions enable improved luminance of the display apparatus.

10. The image display apparatus according to claim 4, wherein said concave portions enable the predetermined gap between said electrodes of said light sources and said chassis to be greater than a gap of at least central portions of said light sources between said electrodes thereof and corresponding portions of said chassis.

* * * * *